US011035978B2

(12) United States Patent
Teague et al.

(10) Patent No.: US 11,035,978 B2
(45) Date of Patent: Jun. 15, 2021

(54) METHODS AND MEANS FOR EVALUATING AND MONITORING FORMATION CREEP AND SHALE BARRIERS USING IONIZING RADIATION

(71) Applicants: Philip Teague, Spring, TX (US); Melissa Spannuth, Houston, TX (US); Dimitrios Pirovolou, Katy, TX (US)

(72) Inventors: Philip Teague, Spring, TX (US); Melissa Spannuth, Houston, TX (US); Dimitrios Pirovolou, Katy, TX (US)

(73) Assignee: Visuray Intech Ltd. (BVI), Tortola (VG)

( * ) Notice: Subject to any disclaimer, the term of this patent is extended or adjusted under 35 U.S.C. 154(b) by 0 days.

(21) Appl. No.: 16/403,107

(22) Filed: May 3, 2019

(65) Prior Publication Data

US 2019/0257976 A1    Aug. 22, 2019

Related U.S. Application Data

(60) Provisional application No. 62/666,440, filed on May 3, 2018.

(51) Int. Cl.
*G01V 5/00* (2006.01)
*G01V 5/12* (2006.01)
*G01V 5/04* (2006.01)

(52) U.S. Cl.
CPC .............. *G01V 5/12* (2013.01); *G01V 5/045* (2013.01)

(58) Field of Classification Search
CPC ................................. G01V 5/12; G01V 5/045
See application file for complete search history.

(56) References Cited

U.S. PATENT DOCUMENTS 3,976,879 A    8/1976  Turcotte
6,725,161 B1*  4/2004  Hillis ...................... G01V 1/48
                                                        702/11

(Continued)

FOREIGN PATENT DOCUMENTS

WO        2018/156857 A1    8/2018

OTHER PUBLICATIONS

Notification of Transmittal of the International Search Report and the Written Opinion of the International Searching Authority, or the Declaration issued in the corresponding PCT International Application No. PCT/US2019/030676, dated Aug. 5, 2019 (14 pages).

*Primary Examiner* — Kiho Kim
(74) *Attorney, Agent, or Firm* — Adams and Reese LLP; Raymond R. Ferrera

(57) ABSTRACT

An x-ray-based reservoir evaluation tool for the measurement of the shale density anticipated at shale-creep barrier within a cased borehole is disclosed, wherein the tool includes an internal length comprising a sonde section, wherein the sonde section further includes an x-ray source; a plurality of radiation measuring detectors; sonde-dependent electronics; and a plurality of tool logic electronics and PSUs. A method of using an x-ray-based shale-seal evaluation tool for measuring the shale density anticipated at shale-creep barrier within a cased borehole is also disclosed, the method including: using x-rays to illuminate the formation surrounding the cased borehole; using detectors to directly measure the density of the formation; using detectors to directly measure the effects on the measurement from tool stand-off or production liner attenuation; and compensating for the production liner and liner-annular region when computing the saturated formation density within the production interval.

13 Claims, 3 Drawing Sheets

(56) References Cited

U.S. PATENT DOCUMENTS

| | | | |
|---|---|---|---|
| 7,564,948 B2* | 7/2009 | Wraight et al. | H05G 1/10 |
| | | | 378/101 |
| 2010/0229623 A1* | 9/2010 | Abad | E21B 49/08 |
| | | | 73/1.02 |
| 2014/0083771 A1 | 3/2014 | Clark | |
| 2017/0218749 A1 | 8/2017 | Lee et al. | |
| 2018/0113233 A1* | 4/2018 | Vinokurov | G01V 5/06 |
| 2019/0101666 A1* | 4/2019 | Arrambide | E21B 47/11 |

\* cited by examiner

METHODS AND MEANS FOR EVALUATING AND MONITORING FORMATION CREEP AND SHALE BARRIERS USING IONIZING RADIATION

TECHNICAL FIELD

The present invention relates generally to management of hydrocarbon producing wells, and in a particular though non-limiting embodiment to methods and means for monitoring and determining annular seal integrity, zonal isolation, and well integrity within single or multi-string wellbore environments that use formation creep or shale as a means to provide a zonal barrier.

BACKGROUND

Within the oil & gas industry, the requirement to gauge the quality of a barrier through casing is important, as is the ability to determine the status of the annuli. The industry currently utilized several different methods for verification of the hydraulic seal behind a single casing string. Typically, ultra-sonic tools are run within the well to determine whether the annular materials are bonded to the outside of the casing, thereby indicating the presence of cement in the annulus between the casing and formation, or between the casing and an outer casing. Ultimately, a leak-off (pressure) test is required to ensure that zonal isolation has been achieved as Ultrasonic tools are highly dependent upon quality of the casing, the bond between the casing and the material in the annulus, and the mechanical properties of the material in the annulus to be able to work correctly. In addition, ultrasonic tools treat the material in the annulus as a single isotropic and homogenous volume, any actual deviation away from this ideal leads to inaccuracies in the measurement.

Current tools can offer information regarding the direct bond of the annular materials to the inner-most casing, yet do not have the ability to discriminate various depths into the annular materials. This can lead to the possibility that fluid-migration paths may exist at the formation boundary, within the cement, or between the casing and an outer casing, thereby leading to a loss of zonal isolation.

Plugging and abandonment (hereinafter, "P&A") of old well tracks require suitable barriers to be put in place. Barrier requirements, for example NORSOK D-010, require a double barrier approach, which is typically satisfied by annular cement and the wellhead itself. However, during P&A operations, the wellhead is often removed, such that an additional barrier is required.

Typically during P&A operations, the primary barrier (e.g., cement) can be suitably measured, but an additional 50 m interval of secondary barrier needs to be demonstrated as well. Shale could be used as a formation 'barrier' as is creeps and swells, thereby sealing around the casing. However, current technologies cannot accurately assess the quality of the seal created by the shale, as shale that has physically pressed against the outer-diameter of the well casing can be detected, but not whether fluid migration paths exist within the shale itself.

A permanent well barrier will ideally have the following properties:
Impermeable
Long-term integrity
Non-shrinking
Ductile (non-brittle) to withstand mechanical loads/impact.
Resistance to chemicals/substances
Wetting, to ensure bonding to steel.

Swelling shale, which has been shown to invade the annular materials surrounding a well casing, can satisfy the above requirements. However, the need to prove the quality and distribution of the shale is still paramount.

No viable technologies are currently available which are able to determine the radial and azimuthal position of anomalies within the annular region (up to the formation boundary) to ensure that no fluid-paths exist which may pose a risk to zonal isolation and well integrity using formation and/or shale as a secondary barrier.

Prior art teaches a variety of techniques that use x-rays or other radiant energy to inspect or obtain information about the structures within or surrounding the borehole of a water, oil or gas well, yet none teach of a method capable of accurately analyzing the azimuthal and radial position of anomalies in the annular materials surrounding a well-bore in single or multi-string cased well environments to be able to determine the extent and quantitatively examine the quality of formation or shale creep.

U.S. Pat. No. 7,675,029 to Teague et al. teaches an apparatus that permits the measurement of x-ray backscattered photons from any horizontal surface inside of a borehole using two-dimensional imaging techniques.

U.S. Pat. No. 8,481,919 to Teague teaches a method of producing Compton-spectrum radiation in a borehole without the use of radioactive isotopes, and further describes rotating collimators disposed around a fixed source installed internally to the apparatus, but does not have solid-state detectors with collimators. The '919 to Teague also teaches of the use of conical and radially symmetrical anode arrangements to permit the production of panoramic x-ray radiation. The reference, however, fails to teach of a means or method to achieve such through the steel wall of a single or multiple well casings, thereby discriminating against signals signal originating from behind the casings from annular materials such as cement. The reference also fails to disclose a non-padded (i.e., concentric) tooling technique within a single or multi-string cased hole environment.

CA 1,022,902 to Avedisian discloses a liquid-impermeable geo-logic barrier made from shale. The preferred shale is Brainketa Shale, the upper shale formation in the Maquoketa Group, which is excavated to expose solid, unweathered shale in its original sedimentary state. The Brainard shale is removed by a suitable mining operation and then crushed into an aggregate that can be readily compacted.

Water is added and the shale aggregate is thoroughly mixed to uniformly disperse the water. It is immediately spread in a layer of uniform thickness along a wall to be sealed, and then worked and mixed in place and compacted solid by multiple passes of a sheepsfoot roller. This is repeated in multiple lifts until the barrier reaches a desired total compacted thickness and width.

US20180180765 to Teague it al. teaches of methods and means to create three-dimensional data-sets of variations in cement-filled annuli surrounding the multiple strings of a borehole.

US 2018/0,188,411 to Teague et al. teaches methods and means for creating three-dimensional data-sets of variations in cement-filled annuli surrounding the multiple strings of a borehole using light-house type source collimation techniques and, in addition to source-angle variations, to significantly increasing the special resolution of the tool.

U.S. Pat. No. 7,675,029 to Teague et al. teaches an apparatus for measurement of x-ray backscattered photons from any horizontal surface inside of a borehole that refers to two-dimensional imaging techniques.

U.S. Pat. No. 8,481,919 to Teague teaches a method of producing Compton-spectrum radiation in a borehole without the use of radioactive isotopes, and further describes rotating collimators disposed around a fixed source installed internally to the apparatus but which does not have solid-state detectors with collimators. It further teaches of the use of conical and radially symmetrical anode arrangements that admit to production of panoramic x-ray radiation.

U.S. Pat. No. 7,705,294 to Teague teaches an apparatus that measures backscattered x-rays from the inner layers of a borehole in selected radial directions, with the missing segment data being populated through movement of the apparatus through the borehole. The apparatus permits generation of data for a two-dimensional reconstruction of the well or borehole, though arguably does not expressly teach the necessary geometry for the illuminating x-ray beam to permit discrimination of the depth from which the backscattered photons originated, only their direction.

U.S. Pat. No. 3,564,251 to Youmans discloses the use of a azimuthally scanning collimated x-ray beam used to produce an attenuated signal at a detector for the purposes of producing a spiral-formed log of the inside of a casing or borehole surface immediately surrounding the tool, which is effectively embodied as an x-ray caliper.

U.S. Pat. No. 7,634,059 to Wraight discloses an apparatus that may be used to produce individual two-dimensional x-ray images of the inner surface inside of a borehole using a single pin-hole camera without the technical possibility to ascertain the azimuth of the image being taken, such that a tessellation/stitching of multiple images is not disclosed or even possible.

US2013/0009049 to Smaardyk discloses an apparatus that allows measurement of backscattered x-rays from the inner layers of a borehole.

U.S. Pat. No. 8,138,471 to Shedlock discloses a scanning-beam apparatus based on an x-ray source, a rotatable x-ray beam collimator, and solid-state radiation detectors enabling the imaging of only the inner surfaces of borehole casings and pipelines.

U.S. Pat. No. 5,326,970 to Bayless discloses a tool for measuring backscattered x-rays azimuthally in a single direction to measure formation density, with the x-ray source being based on a linear accelerator.

U.S. Pat. No. 5,081,611 to Hornby discloses a method of back projection to determine acoustic physical parameters of the earth formation longitudinally along the borehole using a single ultrasonic transducer and a number of receivers, which are distributed along the primary axis of the tool.

U.S. Pat. No. 6,725,161 to Hillis discloses a method of placing a transmitter in a borehole and a receiver on the surface of the earth, or a receiver in a borehole and a transmitter on the surface of the earth, in order to determine structural information regarding the geological materials between the transmitter and receiver.

U.S. Pat. No. 6,876,721 to Siddiqui discloses a method of correlating information taken from a core-sample with information from a borehole density log. The core-sample information is derived from a CT scan of the core-sample, whereby the x-ray source and detectors are located on the outside of the sample, and thereby configured as an outside-looking-in arrangement. Various kinds of information from the CT scan such as its bulk density is compared to and correlated with the log information.

U.S. Pat. No. 4,464,569 to Flaum discloses a method of determining the elemental composition of earth formations surrounding a well borehole by processing the detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records the backscattered radiation from the formation surrounding the borehole by means of a pulsed electromagnetic energy or photon source so that characteristic information may be represented in an intensity versus depth plot format.

U.S. Pat. No. 8,664,587 to Evans et al. discloses methods and means for creating azimuthal neutron porosity images in a logging while drilling environment. As bottom hole assembly based systems historically relied upon the rotation of the drill string to assist in the acquisition of azimuthally dependent data, this reference discusses an arrangement of azimuthally static detectors that be implemented in a modern BHA that does not necessarily rotate with the bit by subdividing the neutron detectors into a plurality of azimuthally arranged detectors, each of which are shielded within a moderator in order to infer directionality to incident neutrons and gamma rays.

U.S. Pat. No. 9,012,836 to Wilson et al. discloses a method and means for creating azimuthal neutron porosity images in a wireline environment. The reference discusses an arrangement of azimuthally static detectors that could be implemented in a wireline tool in order to assist an operator in interpreting logs post-fracking by subdividing the neutron detectors into a plurality of azimuthally arranged detectors, each of which are shielded within a moderator so as to infer directionality to incident neutrons and gamma rays.

U.S. Pat. No. 4,883,956 to Manente et al. discloses methods and means for investigation of subsurface earth formations, using an apparatus adapted for movement through a borehole.

Depending upon the formation characteristic or characteristics to be measured, the apparatus may include a natural or artificial radiation source for irradiating the formations with penetrating radiation such as gamma rays, x-rays or neutrons.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rugosity and/or lithology.

SUMMARY

An x-ray-based reservoir evaluation tool for the measurement of the shale density anticipated at shale-creep barrier within a cased borehole is provided, the tool including at least an internal length comprising a sonde section, wherein the sonde section further includes at least an x-ray source; a plurality of radiation measuring detectors; sonde-dependent electronics; and a plurality of tool logic electronics and PSUs.

A method of using an x-ray-based shale-seal evaluation tool for measuring the shale density anticipated at shale-creep barrier within a cased borehole is also provided, the method including at least: using x-rays to illuminate the formation surrounding the cased borehole; using detectors to directly measure the density of the formation; using detectors to directly measure the effects on the measurement from tool stand-off or production liner attenuation; and compensating for the production liner and liner-annular region when computing the saturated formation density within the production interval.

BRIEF DESCRIPTION OF SEVERAL EXAMPLE EMBODIMENTS

The methods and means described herein quantitively measure the density and distribution of formation materials surrounding a wellbore, especially those in contact with the casing strings, in a package that does not require direct physical contact with the well casings (i.e., non-padded).

In one example embodiment, an x-ray-based reservoir evaluation tool [101] is deployed by wireline conveyance [105] into a cased borehole [103], wherein the tool is deployed into the borehole to determine whether a sufficient seal has been provided by formation [104] creep, such as a shale bed [102]. In a further embodiment the tool is enclosed by a pressure housing that ensures well fluids are maintained outside of the housing.

Figure 1:
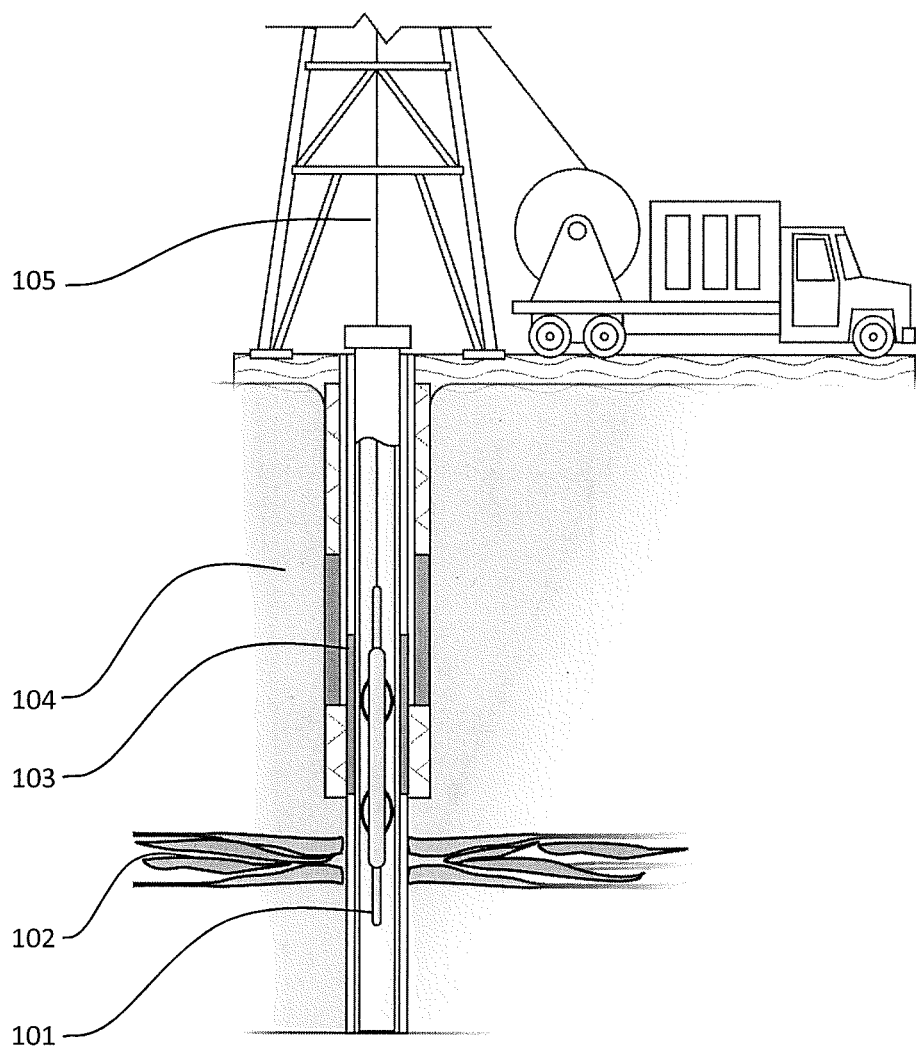
FIG. 1 illustrates an x-ray-based reservoir evaluation tool being deployed into a borehole via wireline conveyance.
Figure 2:
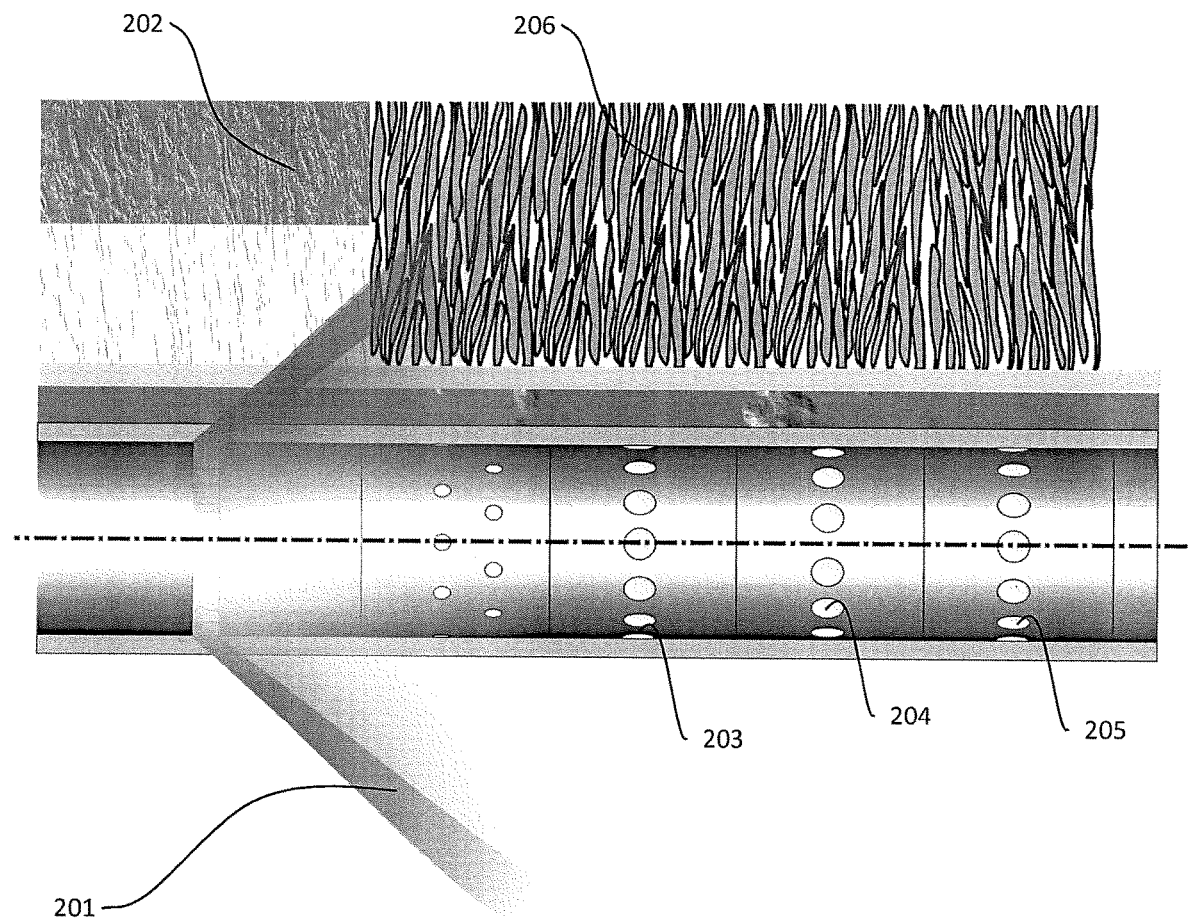
FIG. 2 illustrates one example of a physical layout of an x-ray-based shale evaluation tool.

With further reference to the attached Figures, FIG. 2 illustrates how a conical x-ray beam [201] interacts with the media surrounding the borehole [202], the prime candidate for investigation being shale [206], the counts are detected an axially offset group of detectors [203, 204, 205]. Fluid and casing detector [203] data are mostly contributable to single-event scatter mechanisms, whereas shale-distribution detector [204, 205] group data are mostly comprised of multiple scatter event mechanisms. In another embodiment, cylindrical collimators are used to give directionality to the output of an x-ray source that is located within the pressure housing of a borehole logging tool. In a further embodiment, an azimuthal plurality of x-ray beams are arranged to create a pseudo-cone of x-ray. However, unlike a true cone, the separate fingers of the pseudo-cone are employed to reduce the amount of cross-talk in signals between the detectors. Consequently, lower density regions within the annular materials surrounding the borehole will be detected by different azimuthally located detectors are different rates, such that the most probably azimuthal location of the anomaly can be determined.

Figure 3:
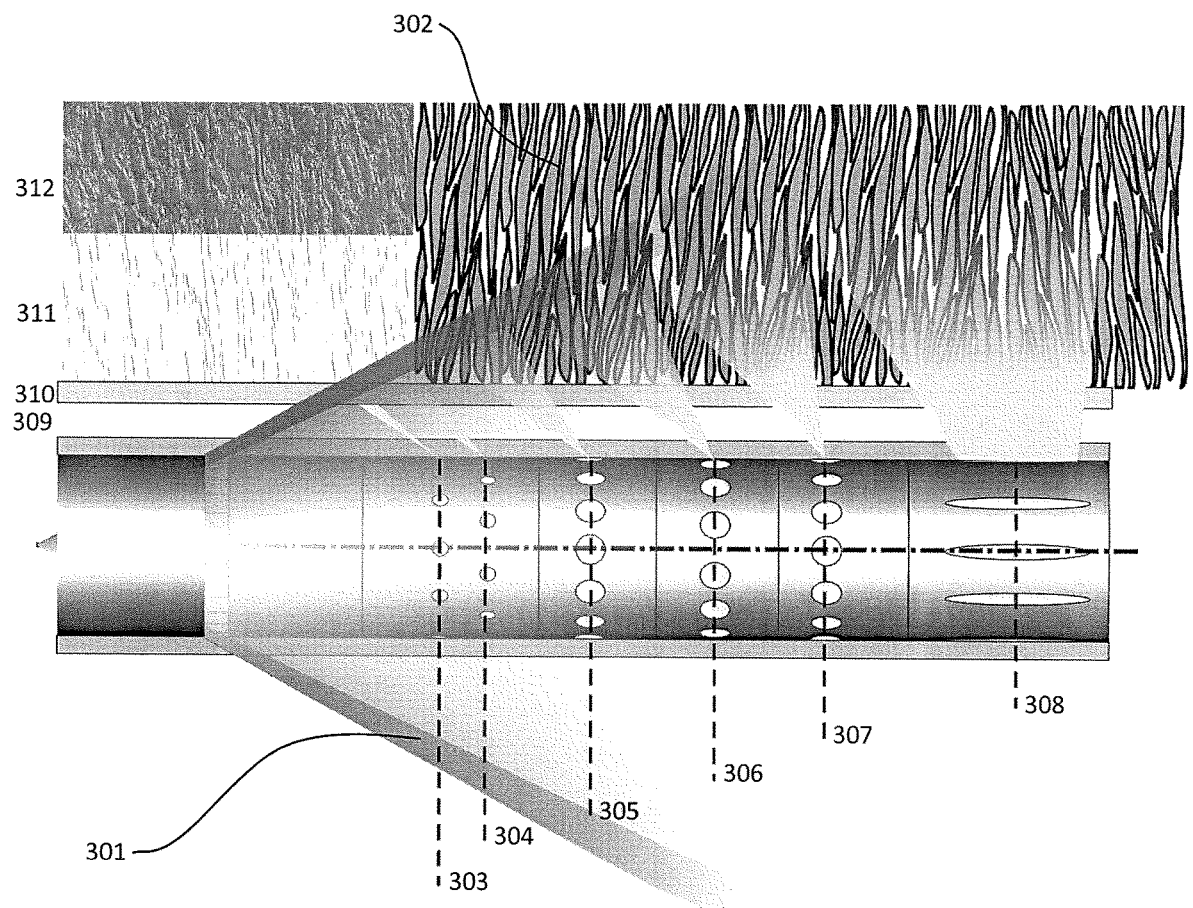
FIG. 3 illustrates one example of a physical layout of an x-ray-based shale evaluation tool, and how the tool could be used to determine the location and quality of shale bed seal within a formation through a production liner/casing.

FIG. 3 illustrates how an x-ray beam [301] (shown as a cone) interacts with the shale [302] surrounding the borehole, the counts that are detected at each axially offset group of detectors [303, 304, 305, 306, 307, 308] is a convolution of the various attenuation factor summations of the detected photons as they traveled through and back through each layer [309, 310, 311, 312] of the borehole surroundings. As the axial offset from the x-ray source to the detector increases, so does the amount of convolution of the detected photon. An additional function is the mean free path lengths of the various materials as a function of x-ray photon energy.

Lower axially-offset detector data will be mostly contributable to single-event scatter mechanisms, whereas higher-offset detector group data will be mostly comprised of multiple scatter event mechanisms. The data each detector may be deconvoluted through the use of the data collected by the corresponding detector with a lower axial offset (lower radial depth of investigation). Using a multi-step approach, the signal from each detector may be deconvoluted (compensated) such that the result is a measure of the density of the material within the depth of investigation (region of interest) of a specific detector.

In an alternative embodiment, the data from each detector is deconvoluted through the use of the data collected by the lowest axial offset detector group in order to compensate for fluid-thickness and casing variations alone. Using a single-step approach, the signal from each detector is compensated such that the result is a measure of the density of the material within the depth of investigation (region of interest) combined with a function of the attenuations and scattering cross-sections of the materials in lower depths of investigations (or lower axial offsets).

In a further embodiment, the lowest axially offset detector group's single scatter bias renders the group ideal for measuring offset between the tool housing and the casing, through the well-fluids. As the tool is typically located coaxially with the well-casing (i.e., not padded), the tool will remain mostly centralized. However, any slight variation in well casing diameter (ovality) or inefficiencies in the tool's centralizer mechanisms will result in a longer path length for the x-rays through the wellbore fluid. For this reason, the first order detectors are the primary compensating mechanism for changes in path-length and attenuation for the higher order detectors. In addition, comparison of each of the azimuthally distributed first order detectors can be employed such that the physical location of the tool within the casing (as a function of offset from the centerline) can be determined.

In a further embodiment, comparison of axially offset azimuthal groupings of detectors can also be used to determine the radial position of prospective density anomalies within the shale or formation. In this respect, if an anomaly is located within the outer annulus between an outer casing and the formation, then only higher order detector groups will detect a change in incoming photon intensity/counts, whereas lower order detector groups' depth of investigation would be too low to detect said anomaly. An anomaly detected by a lower order detector group will be detected by both the lower order anomaly detectors and the higher order detectors as the x-ray beam passes through all of those regions of interest. An anomaly located at a lower (inner) depth of investigation will have convoluting impact on the higher order detectors. The difference between the impact on higher and lower order detectors serves as the basis for determining the radial position of a density anomaly located within the annular materials surrounding a borehole.

In a further embodiment, the data collected from each azimuthal plane is processed to create a two dimensional density map of the shale extending out from the outer surface of the first casing to a significant distance into the formation surrounding the borehole, thereby capturing all of the density data for the materials as a function of axial position and radial position, over a significant axial interval, such as 50 meters, by moving the tool through the well.

In a further embodiment, the data collected from each 'azimuth' is compared with neighboring azimuths to ascertain the azimuthal position of an anomaly so that the two dimensional maps can be amalgamated into a three dimensional map of the density data for the materials as a function of axial position, azimuthal and radial position In a further embodiment, the data collected is presented as either traditional 2D logs (as a function of depth), as a three-dimensional density model, or as slices or sections of such. The data can also be further processed through machine learning so that a neural network is trained to look for signal abnormalities, or by setting simple discriminators on the (calibrated) gradients and differences between axially offset detector group data collections.

In a further embodiment, the density log data is combinable with other measurements, such as neutron porosity, to improve the quality of the interpretation of the data to better determine the depth at which the shale bed exists.

In a further embodiment, existing open-hole logs are used to establish a baseline profile, as a function of depth, for the formation density so that sensitivity to the formation seal could be improved.

In a further embodiment, the tool is integrated into a Logging-while-drilling tool.

In a further embodiment, the tool is configured for thru-wiring for combination with other tools.

In a further embodiment, the tool would be powered by a mud turbine.

In a further embodiment, the tool is powered by a battery.

In a further embodiment, machine learning is used such that algorithms are taught indicators of a good shale seal when comparing logs and log types so that the process of determining the presence and/or quality of the shale seal can be automated.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray-based reservoir evaluation tool for the measurement of the shale density anticipated at shale-creep barrier within a cased borehole, wherein said tool comprises:
   an internal length comprising a sonde section, wherein said sonde section further comprises an x-ray source;
   a plurality of radiation measuring detectors arranged azimuthally around the sonde and axially offset;
   additional axially-offset radiation detectors for compensating for the production liner and liner-annular region effects when computing the formation density within the shale bed;
   sonde-dependent electronics;
   and a plurality of tool logic electronics and PSUs.

2. The tool of claim 1, wherein the tool is configured so as to permit through-wiring.

3. The tool in claim 1, wherein the tool is combinable with other measurement tools comprising one or more of neutron-porosity, natural gamma and array induction tools.

4. The tool in claim 1, wherein the tool is used to determine the position and density of a shale bed through production liners or production casing.

5. The tool in claim 1, wherein the tool is integrated into a logging-while-drilling assembly.

6. The tool in claim 1, wherein the tool is powered by mud-turbine generators.

7. The tool in claim 1, wherein the tool is powered by a battery.

8. A method of using an x-ray-based shale-seal evaluation tool for measuring the shale density anticipated at shale-creep barrier within a cased borehole, wherein said method comprises:
   using x-rays to illuminate the formation surrounding the cased borehole;
   using detectors to directly measure the density of the formation;
   using detectors to directly measure the effects on the measurement from tool stand-off or production liner attenuation, and;
   compensating for the production liner and liner-annular region when computing the saturated formation density within the production interval.

9. The method of claim 8, wherein the method is combinable with other measurement methods comprising one or more of neutron-porosity, natural gamma and array induction tools.

10. The method of claim 8, wherein the tool is used to determine the position of the shale bed through production liners or production casing.

11. The method of claim 8, wherein the tool is integrated into a logging-while-drilling assembly.

12. The method of claim 8, wherein the tool is powered by mud-turbine generators.

13. The method of claim 8, wherein the tool is powered by a battery.

* * * * *